United States Patent [19]
Kim

[11] Patent Number: 5,933,208
[45] Date of Patent: Aug. 3, 1999

[54] LIQUID CRYSTAL DISPLAY WITH COLOR FILTER AND LIGHT SHIELDING LAYER FORMING A SUBSTANTIALLY PLANARIZED SURFACE OVER THE TFT

[75] Inventor: Byeong-Koo Kim, Yiwang-si, Rep. of Korea

[73] Assignee: LG Electronics, Inc., Seoul, Rep. of Korea

[21] Appl. No.: 08/803,229

[22] Filed: Feb. 20, 1997

[30] Foreign Application Priority Data

Apr. 25, 1996 [KR] Rep. of Korea ..................... 96-12911

[51] Int. Cl.$^6$ .................... G02F 1/1335; G02F 1/1333
[52] U.S. Cl. ................. 349/106; 349/106; 349/110; 349/104; 349/122
[58] Field of Search .................. 349/106, 110, 349/122

[56] References Cited

U.S. PATENT DOCUMENTS

| | | | |
|---|---|---|---|
| 4,636,038 | 1/1987 | Kitahara et al. | 350/339 |
| 5,229,644 | 7/1993 | Wakai et al. | 257/749 |
| 5,251,071 | 10/1993 | Kusukawa et al. | 359/891 |
| 5,327,001 | 7/1994 | Wakai et al. | 257/350 |
| 5,495,354 | 2/1996 | Jo | 349/106 |
| 5,585,951 | 12/1996 | Noda et al. | 349/122 |
| 5,641,974 | 6/1997 | Boer et al. | 257/59 |
| 5,786,042 | 7/1998 | Inoue et al. | 428/1 |
| 5,818,550 | 10/1998 | Kadota et al. | 349/106 |

FOREIGN PATENT DOCUMENTS

| | | |
|---|---|---|
| 63-279228 | 11/1988 | Japan . |
| 63-289955 | 11/1988 | Japan . |
| 04-68318 | 3/1992 | Japan . |
| 04-163528 | 6/1992 | Japan . |
| 04-253028 | 9/1992 | Japan .................. 349/106 |

OTHER PUBLICATIONS

Toshihara Ueki et al., *Dye embedded BM resin and three dimensional picture element implemented by BM On Array technology for the first time*, Nikkei Microdevices, 60–62 (Jul. 1994).

M.J. Radler et al., *Cyclotene™ Advanced Electronics Resins for High–Aperture AMLCD Applications*, SID 96 Applications Digest, pp. 33–36 (1996).

D.J. Perettie et al., *Benzocyclobutene as a Planarization Overcoat for Flat Panel Displays*, ASIA Display '95, pp. 721–724 (1995).

Koji Kishimoto, *Low–dielectric–constant interlayer insulating film and its manufacturing method*, Electronic Journal, pp. 33–35 (Mar. 1996).

Toshihara Ueki et al., *Dye embedded BM resin and three dimensional picture element implemented by BM on Array technology for the first time*, Nikkei Microdevices, pp. 60–62 (Jul. 1994).

*Primary Examiner*—William L. Sikes
*Assistant Examiner*—Kari M. Horney
*Attorney, Agent, or Firm*—Morgan, Lewis & Bockius LLP

[57] ABSTRACT

A liquid crystal display has a substrate; a transistor over the substrate, the transistor having a gate, a source, and a drain; a light shielding layer over the transistor; a color filter at sides of the light shielding layer, the color filter having a substantially consistent thickness; and a pixel electrode over the color filter, the pixel electrode being connected to one of the source and the drain of the transistor.

17 Claims, 5 Drawing Sheets

LIQUID CRYSTAL DISPLAY WITH COLOR FILTER AND LIGHT SHIELDING LAYER FORMING A SUBSTANTIALLY PLANARIZED SURFACE OVER THE TFT

BACKGROUND OF THE INVENTION

1. Field of the Invention

The present invention relates to a thin film transistor (TFT) array substrate and its fabrication method, and more particularly, to a TFT array substrate for a liquid crystal display and its fabrication method.

2. Discussion of the Related Art

In the conventional TFT liquid crystal display, liquid crystal is filled between a TFT array substrate (lower substrate) and a color filter (upper substrate). The lower substrate has a plurality of pixels vertically and horizontally arranged. A thin film transistor (TFT) is formed at each pixel as a switching device. A pixel electrode is coupled to the drain electrode of the TFT. A plurality of gate bus lines (gate lines) are formed in one direction and connected to the gate electrodes of the TFTs. A plurality of data bus lines (data lines) are formed in the other direction and connected to the channel electrodes.

On the upper substrate, color filters of red, green, and blue are formed in positions corresponding to the respective pixels of the lower substrate. A black matrix (light shielding layer) of chrome is formed in the regions between the color filters, i.e., the regions corresponding to the data bus lines, gate bus lines, and TFTs of the lower substrate. A protective layer is formed on the surfaces of the color filters and the black matrix. On the protective layer, a common electrode is formed so as to apply an electric field to liquid crystal located between the common electrode and the pixel electrodes.

In such a conventional liquid crystal display, the upper substrate has the black matrix. Therefore, in designing the size of the black matrix, the margins for possible misalignment between the upper and lower substrates must be taken into account. This results in a lower aperture ratio.

FIGS. 1A and 1B show another example of a TFT array substrate (lower substrate) of a liquid crystal display. In this case, the black matrix and the color filter, which were formed on the upper substrate above, are formed on the lower substrate. A gate electrode 11-1 and a gate bus line 11-2 are formed on a substrate 10. A gate insulating layer 12 is formed on the gate bus line. An island-shape active layer 13 is formed on the gate insulating layer 12 over the gate electrode 11-1. An ohmic contact layer 14 such as a doped semiconductor layer is formed on separate regions of the active layer 13. A source electrode 16-1 and a drain electrode 17 are formed on the ohmic contact layer 14. A data bus line 16-2 crossing over the gate bus line 11-2 is connected to the source electrode 16-1 of the TFT. A pixel electrode 15 connected to the bottom of the drain electrode 17 is formed in an area defined by the gate bus line 11-2 and the data bus line 16-2. A color filter 18 is formed so as to completely cover the pixel electrode 15. A protective layer 19 is formed on the color filter 18 and the TFT. A metal black matrix 20 of chrome or the like is formed on the protective layer 19 to completely cover the TFT, the gate bus line 11-2, and the data bus line 16-2. Here, the metal black matrix 20 is formed so as to be superposed on a portion of the pixel electrode in order to prevent light leakage.

In a liquid crystal display having the TFT array substrate shown in FIG. 1, the molecular orientation of liquid crystal is controlled by a voltage difference between the pixel electrode and the common electrode, and thus depends on a signal voltage applied to the pixel electrode and a common electrode voltage. Here, the area available for the pixel electrode is limited because the pixel electrode and the data bus line are formed on the same layer. This casts a limitation in expanding the aperture portion. Also, the black matrix overlaps the data bus line and the protective layer is formed in between. Thus, they together form a parasitic capacitance which causes various problems such as signal distortion, short, and crosstalk.

SUMMARY OF THE INVENTION

Accordingly, the present invention is directed to a TFT array substrate and its fabrication method that substantially obviate one or more of the problems due to limitations and disadvantages of the related art.

An object of the present invention is to provide a liquid crystal display which has an improved aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thin-film-transistor (TFT) array substrate of the present invention includes a substrate; at least one gate bus line formed on the substrate; at least one data bus line formed to intersect with the gate bus line; at least one TFT whose gate electrode is coupled to the gate bus line, and one channel electrode of which is coupled to the data bus line; a resin black matrix formed at least to cover the data bus line, gate bus line and TFT; a color filter pattern formed over the exposed resultant structure other than the resin black matrix; and a pixel electrode covering part of the resin black matrix and color filter, the pixel electrode being connected to a drain electrode of the TFT.

In another aspect, the present invention provides a method of fabricating a thin-film-transistor (TFT) array substrate including the steps of (a) forming a TFT arranged in matrix on part of a substrate, a gate bus line coupled to a gate electrode of the TFT, and a data bus line intersected with the gate bus line and coupled to a source electrode of the TFT; (b) coating opaque resin over the exposed substrate, and patterning the opaque resin to remain on the TFT excluding the drain electrode of the TFT, and on the data bus line and gate bus line, to thereby form a resin black matrix; (c) coating a color resist over the resin black matrix and the exposed substrate, and patterning the resultant structure to thereby form a color filter above the resin black matrix and on a region where the drain electrode is exposed; and (d) stacking a transparent conductive material on the color filter and on the exposed surface of the resin black matrix, and forming a pixel electrode coupled to the drain electrode so that part of the resin black matrix and the color filter are covered.

In another aspect, a liquid crystal display in the present invention includes a substrate; a transistor over the substrate, the transistor having a gate, a source, and a drain; light shielding layer over the transistor; a color filter at sides of the light shielding layer, the color filter having a substantially consistent thickness; and a pixel electrode over the color filter, the pixel electrode being connected to one of the source and the drain of the transistor.

In another aspect, a liquid crystal display having a transistor in the present invention includes a substrate; a gate line over the substrate; a light shielding layer over the gate line; a color filter at sides of the light shielding layer, the color filter having a substantially consistent thickness; and a pixel electrode over the color filter.

In another aspect, a liquid crystal display having a transistor in the present invention includes a substrate; a data line over the substrate; a light shielding layer over the data line; a color filter at sides of the light shielding layer, the color filter having a substantially consistent thickness; and a pixel electrode over the color filter.

In another aspect, a liquid crystal display having a transistor in the present invention includes a substrate; a transistor over the substrate, the transistor having a gate, a source, and a drain; a gate line over the substrate connected to the gate of the transistor; a data line over the substrate connected to one of the drain and source of the transistor; a light shielding layer over the transistor, the gate line, and the data line; a color filter at sides of the light shielding layer, the color filter having a substantially consistent thickness; and a pixel electrode over the color filter, the pixel electrode being connected to one of the source and the drain of the transistor.

In a further aspect, the present invention provides a method of fabricating a liquid crystal display having a substrate, including the steps of forming a transistor having a gate, a source, and a drain over the substrate; forming a light shielding layer over the transistor; forming a color filter at sides of the light shielding layer; and forming a pixel electrode over the color filter, the pixel electrode being connected to one of the source and the drain of the transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
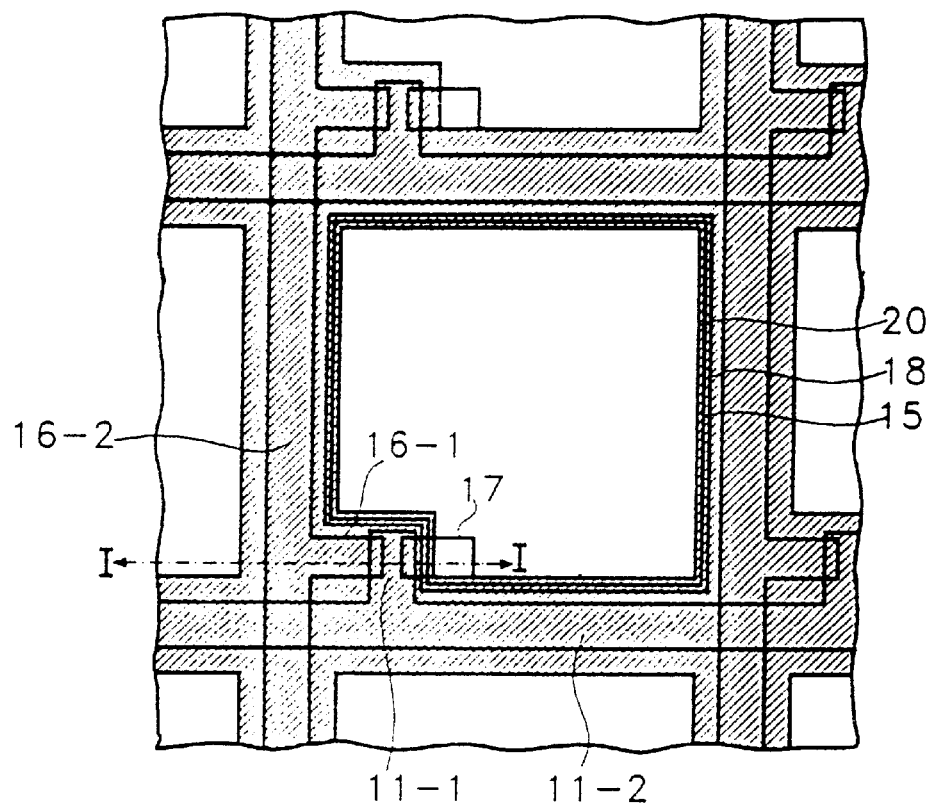
FIGS. 1A and 1B are a layout and a sectional view of a conventional TFT array substrate, respectively.
Figure 1B:
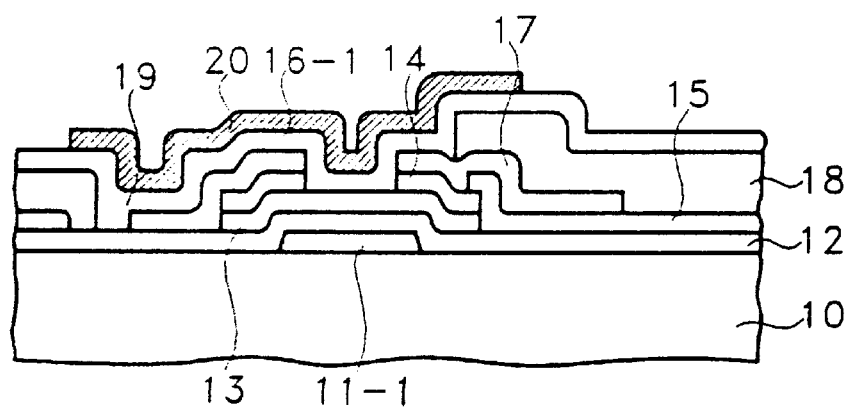
Figure 2A:
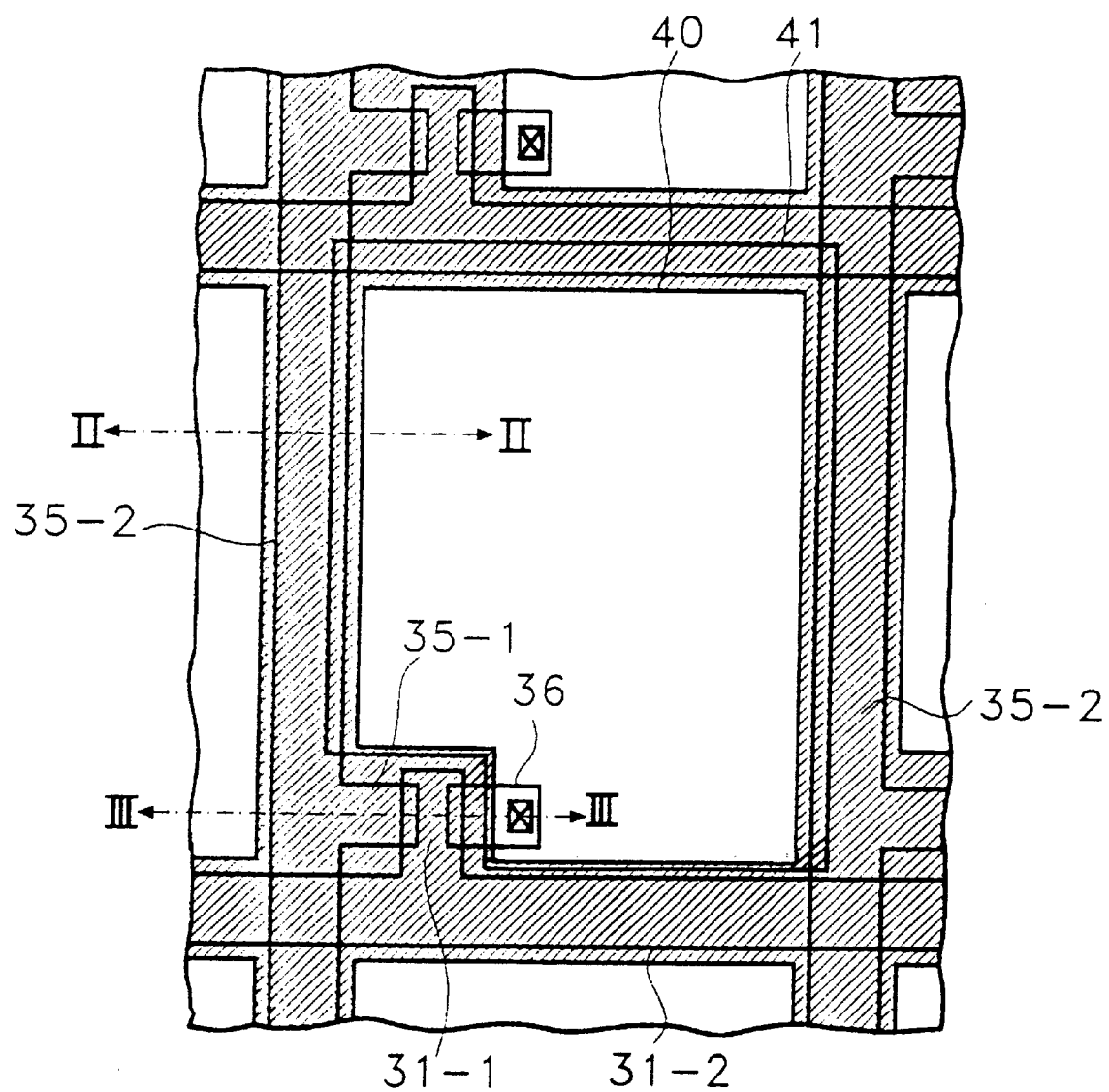
FIGS. 2A, 2B and 2C are a layout and sectional views of a TFT array substrate of the present invention, respectively.
Figure 2B:
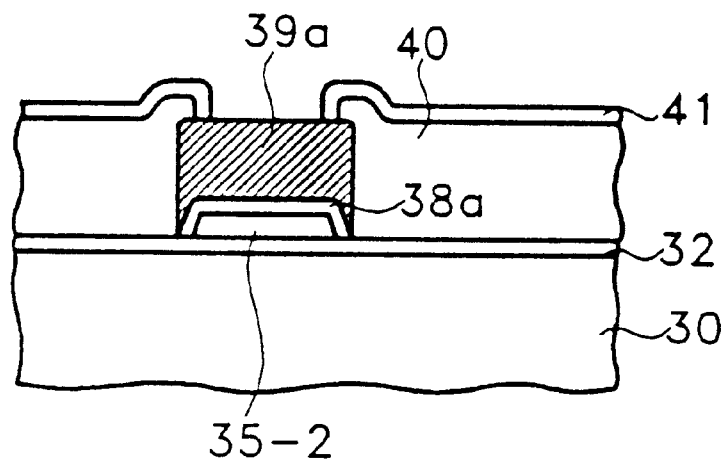
Figure 2C:
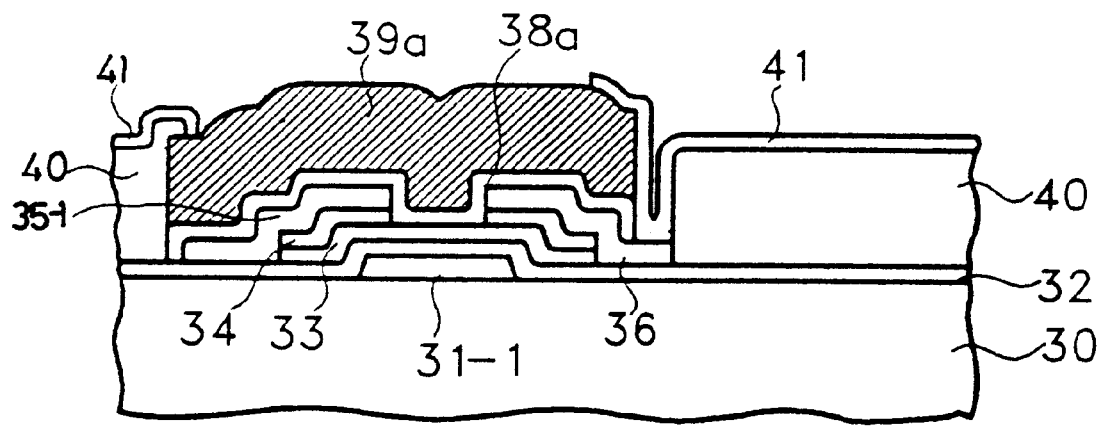

FIG. 2A is a plan view of the TFT array substrate at the vicinity of one pixel according to the present invention. FIG. 2B is a sectional view of the data bus line area taken along line II—II of FIG. 2A. FIG. 2C is a sectional view of the TFT area taken along line III—III of FIG. 3A.

A gate bus line 31-2 crosses a data bus line 35-2 as shown in FIG. 2A. A TFT is formed near the intersection of bus lines 31-2 and 35-2 and the gate electrode 31-1 extends or protrudes from a gate bus line 31-1. A pixel electrode 41 is formed in an area defined by the bus lines 31-2 and 35-2. The pixel electrode 41 is connected to the channel electrode 36 (drain electrode) of the TFT, and overlaps portions of bus lines 31-2 and 35-2 excluding its own gate bus line (gate bus line for the TFT to which the pixel electrode 41 is connected). A resin black matrix 39a is formed so as to completely cover bus lines 31-2 and 35-2 and the TFT. A color filter 40 is formed on an area surrounded by the resin black matrix 39a.

Here, the gate bus line 31-2 and a portion of the pixel electrode 41 which overlaps the gate bus line can be used as two electrodes for a storage capacitor. The capacitance of the storage capacitor can be altered by adjusting the degree of superposition between the gate bus line 31-2 and the pixel electrode 41. The pixel electrode 41 and its own gate bus line 31-2, however, are not superposed with each other, preventing undesirable parasitic capacitance by the metal-insulator-metal (MIM) structure: gate insulating layer/protective layer/resin black matrix/pixel electrode. If they overlap with each other, the parasitic capacitance would be small because the insulating layer between the two metal layers is thick. Nonetheless, such parasitic capacitance could cause problems such as signal distortion and crosstalk, resulting in deterioration of picture characteristics.

FIG. 2B illustrates the structure of the TFT array substrate near the data bus line. The gate insulating layer 32 is provided on the substrate 30, and the data bus line 35-2 is placed thereon. A protective layer 38a is formed on the data bus line 35-2. The resin black matrix 39a completely covers the data bus line 35-2. The color filter 40 is located on the gate insulating layer 32 on both sides of the resin black matrix 39a and the protective layer 38a. The pixel electrode 41 is formed on the color filter 40 and extends to the top of the resin black matrix 39a so as to be separated from the adjoining pixel by the minimum distance necessary for insulation.

FIG. 2C illustrates the structure near the TFT. The gate electrode 31-1 is placed on the substrate 30, and the gate insulating layer 32 is formed thereon. On the gate insulating layer 32, an active layer 33 is formed so as to cover the gate electrode 31-1. An ohmic contact layer 34 is formed on separate regions of the active layer 33. The source electrode 35-1 and the drain electrode 36 are in contact with the ohmic contact layer 34. The protective layer 38a is formed on the source and drain electrodes 35-1, 36 and the exposed potion of the active layer 33. Here, a part of drain electrode 36 remains uncovered. The resin black matrix 39a is formed on the protective layer 38a in the same pattern as the protective layer 38a. The resin black matrix 39a is normally 1–2 μm thick in consideration of the resin's light absorption coefficient. On the side of the resin black matrix 39a, the color filter 40 is formed as thick as the sum of the resin black matrix 39a and the TFT, while exposing a part of the drain electrode 36.

Next, the pixel electrode 41 is formed on the color filter 40 to be connected to the drain electrode 36 of the TFT via a contact hole formed on the border of the resin black matrix 39a and the color filter 40.

In this embodiment described above, the protective layer is formed beneath the resin black matrix. Usually, the protective layer is formed for protection of layers beneath and for surface planarization. This protective layer may be formed thinner or omitted because the resin black matrix and the color filter can be chosen such that they serve to protect the layers beneath and planarize the surface profile. Also, if desired, the protective layer may be formed so as to extend below the color filter 40. In this case, the protective layer does not have the same pattern as the resin black matrix.

Figure 3A:
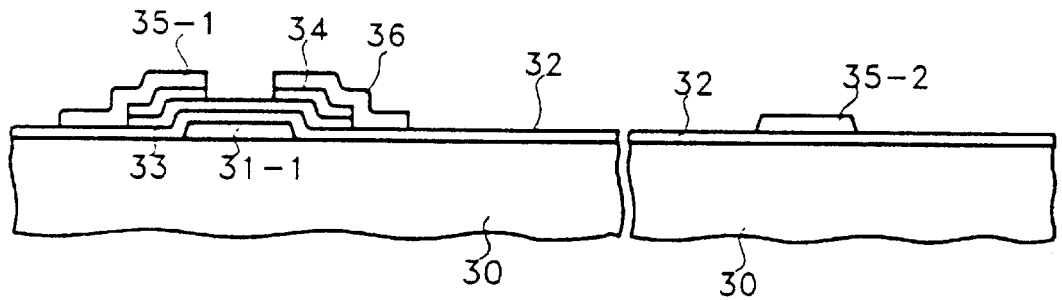
FIGS. 3A–3E are sectional views illustrating the manufacturing process of a TFT array substrate according to the present invention.

Referring to FIGS. 3A–3E, a manufacturing process of the TFT array substrate according to the present invention will be described. As shown in FIG. 3A, a TFT has a gate electrode 31-1, a gate insulating layer 32 over the substrate, an active layer 33, a source electrode 35-1 and a drain electrode 36. The gate insulating layer 32 is interposed between the gate electrode 31-1 and the active layer 33. An ohmic contact layer 34 is formed on separate portions of the active layer 33, and provides ohmic contacts between the active layer 33 and the source and drain electrodes 35-1, 36. In addition, a gate bus line (not shown) is formed and connected to the gate electrode 31 of the TFT. A data bus line 35-2 is formed so as to cross the gate bus line and connected to the source electrode 35-1 of the TFT.

Figure 3B:
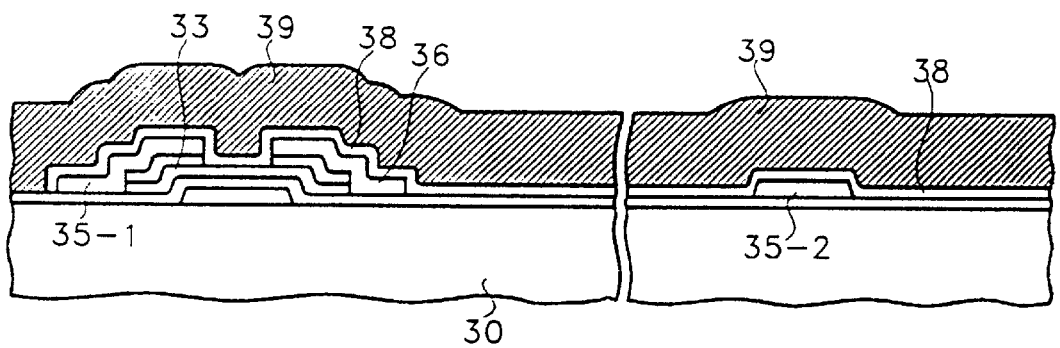

Referring to FIG. 3B, an insulating layer 38 for a protective layer, such as a silicon nitride layer $SiN_x$ or a silicon oxide layer $SiO_2$, is deposited on the overall surface of the substrate including the TFT, the exposed portion of the gate insulating layer 32, and the data bus line 35-2, by a chemical vapor deposition (CVD) method. Subsequently, an opaque resin 39, 1–2 $\mu$m thick is coated thereon.

Figure 3C:
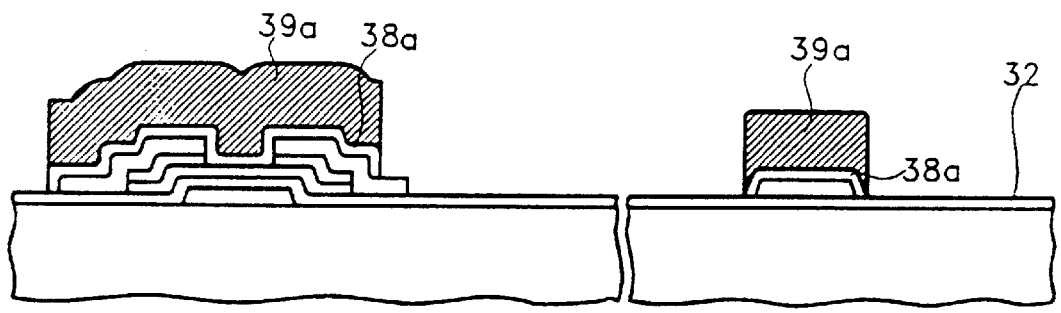

Referring to FIG. 3C, the opaque resin 39 is patterned to form a resin black matrix 39a by using photolithography. The resultant resin black matrix pattern covers the data bus line 35-2, the gate bus line, and the TFT, but exposes a portion of the insulating layer 38 above the drain electrode 36 which is to be connected to a pixel electrode. Then, the insulating layer 38 is selectively etched to yield the same pattern as the resin black matrix 39a, thereby forming a protective layer 38a. Here, this step for etching the insulating layer 38 can be omitted if the insulating layer 38 for protective layer is to be left on the surface of the substrate.

Figure 3D:
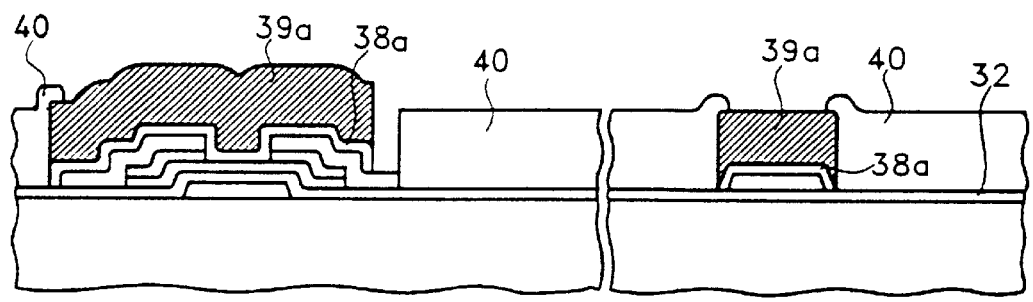

Turning to FIG. 3D, a color resist is coated on the overall surface of the substrate including a resin black matrix 39a, and patterned to form a color filter 40. This patterning can be done by exposing the color resist and developing the exposed color resist. The resulting color filter pattern reaches the side of the resin black matrix 39a except at a portion of the drain electrode 36 which is to be connected to a pixel electrode. As mentioned above, taking account of the opaque resin's light absorption coefficient, the resin black matrix 39a has a thickness of 1–2 $\mu$m. Therefore, to ensure a smooth surface profile, the color filter 40 is designed to have the substantially same thickness as the resin black matrix 39a. This thickness can depend on color.

Figure 3E:
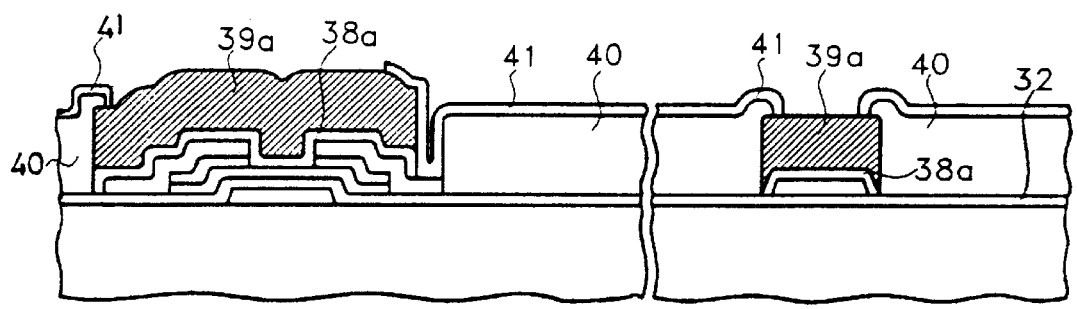

As shown in FIG. 3E, a pixel electrode 41 is formed so as to be connected to the exposed portion of the drain electrode 36. In forming the pixel electrode, a transparent conductive material such as indium tin oxide (ITO) is deposited on the overall surface of the substrate by a sputtering method, and then selectively removed using photolithography. The pixel electrode 41 covers the entire color filter 40, a part of the TFT, and a part of data and gate bus lines. The pixel electrode, however, does not overlap its own gate bus line so as to avoid generation of parasite capacitance. That is, the pixel electrode overlaps only the gate bus line located on the other side of the pixel. This overlapping portion serves as a storage capacitor.

In the above description, the protective layer 38a is formed beneath the resin black matrix 39a. However, the protective layer may be omitted. In this case, the steps of depositing an insulating layer 38 and selectively etching the insulating layer 38 in FIGS. 3B and 3C can be eliminated.

In the TFT array substrate according to the present invention explained above, the color filter is formed in the same substrate as the TFT. In general, prior to the attachment of the upper and lower substrates, an orientation layer such as polyimide is coated on the entire surface of the lower substrate and turned into a molecular orientation layer by a so-called rubbing process. It is known that a stepped surface profile causes a poor rubbing problem in the orientation layer. In this invention, planarization of the surface is achieved by forming the color filter beneath the pixel electrode, thereby eliminating the poor rubbing problem.

In addition, the resin black matrix as much as 1–2 $\mu$m thick is interposed between the pixel electrode and the data bus line. Thus, the parasite capacitance between the pixel electrode and the data bus line is reduced. Accordingly, it becomes possible to enhance the aperture ratio without yielding signal distortion.

It will be apparent to those skilled in the art that various modifications and variations can be made in a TFT array substrate and its fabrication method of the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
   a substrate;
   a transistor over the substrate, the transistor having a gate, a source, and a drain;
   a light shielding layer over the transistor, the light shielding layer including an opaque resin;
   a protective layer between the light shielding layer and the transistor;
   a color filter at sides of the light shielding layer, the color filter having a substantially consistent thickness and being formed of a material different from that of the light shielding layer, wherein an upper surface of the light shielding layer and an upper surface of the color filter are at a substantially same level; and
   a pixel electrode over the color filter, the pixel electrode being connected to one of the source and the drain of the transistor.

2. The liquid crystal display according to claim 1, wherein the color filter includes an organic resin.

3. The liquid crystal display according to claim 1, wherein the protective layer has substantially the same pattern as the light shielding layer.

4. The liquid crystal display according to claim 1, wherein the color filter overlaps the light shielding layer.

5. The liquid crystal display according to claim 1, wherein the color filter is formed of an exposed and developed color resist.

6. A liquid crystal display comprising:
   a substrate;
   a transistor over the substrate, the transistor having a gate, a source, and a drain;
   a gate line over the substrate connected to the gate of the transistor;
   a data line over the substrate connected to one of the drain and source of the transistor;
   a light shielding layer over the transistor, the gate line, and the data line, the light shielding layer including an opaque resin;
   a protective layer between the light shielding layer and the transistor;

a color filter at sides of the light shielding layer, the color filter having a substantially consistent thickness and being formed of a material different from that of the light shielding layer, wherein an upper surface of the light shielding layer and an upper surface of the color filter are at a substantially same level; and a pixel electrode over the color filter, the pixel electrode being connected to one of the source and the drain of the transistor.

7. The liquid crystal display according to claim 6, wherein the color filter includes an organic resin.

8. The liquid crystal display according to claim 6, wherein the protective layer has substantially the same pattern as the light shielding layer.

9. The liquid crystal display according to claim 6, wherein, the pixel electrode overlaps the light shielding layer.

10. The liquid crystal display according to claim 6, wherein the pixel electrode overlaps at least one of the data line and the gate line.

11. The liquid crystal display according to claim 6, wherein the color filter is formed of an exposed and developed color resist.

12. A method of fabricating a liquid crystal display having a substrate, the method comprising the steps of:

forming a transistor having a gate, a source, and a drain over the substrate;

forming a protective layer over the transistor;

forming a light shielding layer on the protective layer over the transistor, the light shielding layer including an opaque resin;

forming a color filter at sides of the light shielding layer, the color filter having a substantially consistent thickness and being formed of a material different from that of the light shielding layer, wherein an upper surface of the light shielding layer and an upper surface of the color filter are at a substantially same level; and forming a pixel electrode over the color filter, the pixel electrode being connected to one of the source and the drain of the transistor.

13. The method according to claim 12, wherein the transistor forming step includes:

forming a gate line connected to the gate of the transistor over the substrate; and forming a data line over the substrate, wherein the data line is connected to one of the source and the drain of the transistor, and wherein the step of forming the light shielding layer comprises locating the light shielding layer over at least one of the gate line and the data line.

14. The method according to claim 12, wherein the protective layer includes silicon nitride.

15. The method according to claim 12, wherein the step of forming the color filter includes the steps of coating a color resist over the overall surface of the substrate, and exposing and developing the color resist to form the color filter at the sides of the light shielding layer.

16. The method according to claim 12, wherein the step of forming the light shielding layer includes the step of depositing the opaque resin over the entire surface of the substrate and patterning the opaque resin to form the light shielding layer substantially covering the transistor.

17. The method according to claim 16, wherein the step of forming the color filter includes the steps of coating a color resist over the overall surface of the substrate, and exposing and developing the color resist to form the color filter at the sides of the light shielding layer.

* * * * *